UNITED STATES PATENT OFFICE.

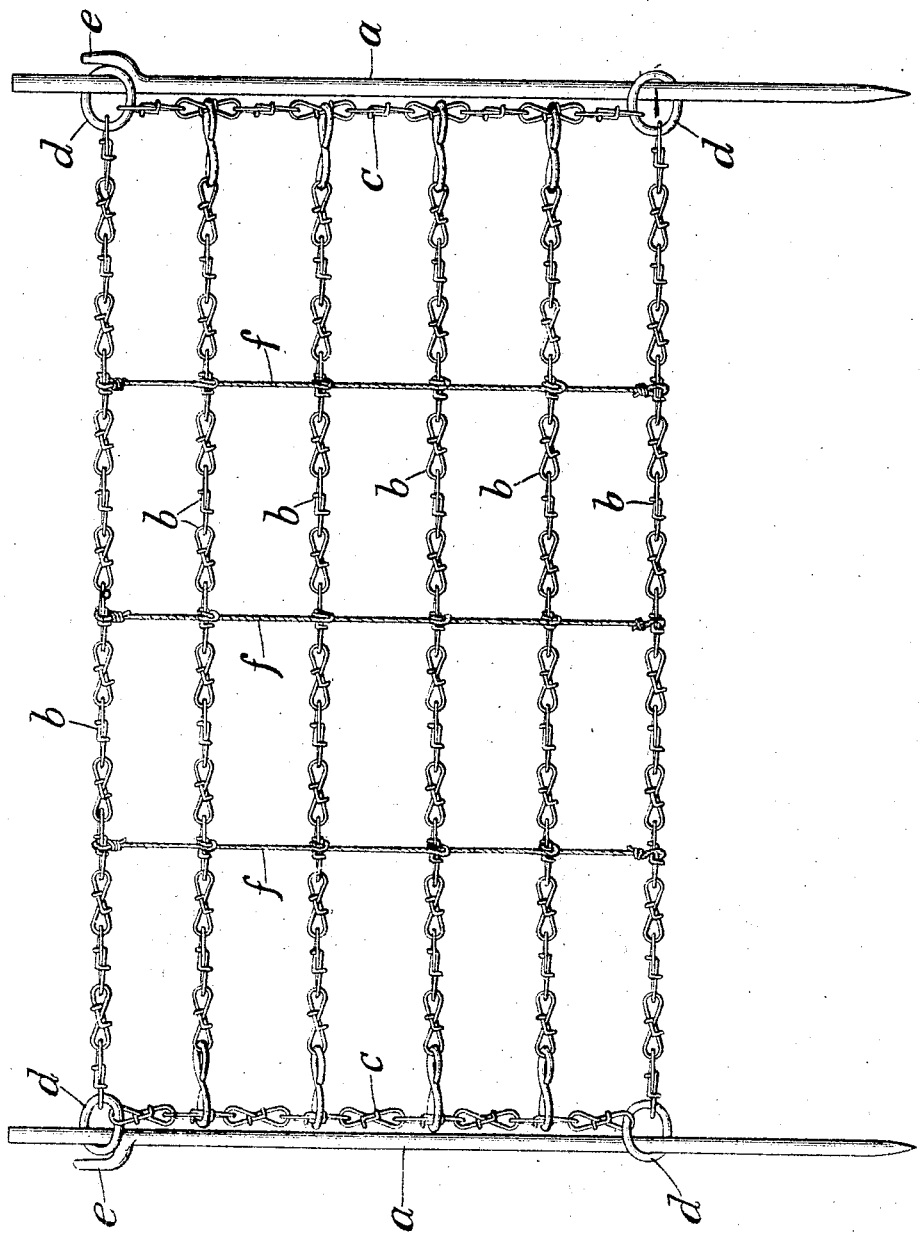

WILLIAM KING BLODGETT, OF POINT PLEASANT, NEW JERSEY, ASSIGNOR, BY MESNE ASSIGNMENTS, TO AMERICAN CHAIN COMPANY, INCORPORATED, OF BRIDGEPORT, CONNECTICUT, A CORPORATION OF NEW YORK.

FISH-GUIDE.

1,095,697.     Specification of Letters Patent.     Patented May 5, 1914.

Application filed January 3, 1911. Serial No. 600,501.

*To all whom it may concern:*

Be it known that I, WILLIAM K. BLODGETT, of Point Pleasant, in the county of Ocean, in the State of New Jersey, have invented new and useful Improvements in Fish-Guides, of which the following, taken in connection with the accompanying drawings, is a full, clear, and exact description.

This invention relates to certain improvements in fish guides, and has for its object the construction of a guide which is adapted to be used in deep water for the purpose of guiding fish into traps.

I have discovered by observation that in placing screens or guides in the water for the purpose of driving the fish in a certain direction, that it is quite unnecessary to have the meshes of the screen or guide of a size sufficiently small to prevent the fish from passing between them, but that the fish will not pass through the screen or guide, although the meshes are several times too large to prevent them from passing through it, but that they will simply come up to this apparent obstruction and then follow along the approaching side without passing through.

To that end therefore this invention consists in a fish guide constructed of a metallic fabric, such as chains or the like and mounted at either end upon poles or stakes, and these are driven down into the mud beneath the water and allowed to remain there any convenient time.

One of the essential features of the invention consists in constructing the fabric essentially of metal chain or articulate members so as to be durable and at the same time this fabric may be mounted upon poles of any convenient size for the work in hand, and to that end my invention consists in several other new and novel features of construction hereinafter described and specifically set forth in the claims hereunto annexed.

It is constructed as follows, reference being had to the drawings in which I show a fabric as it would appear in use, except that the horizontal strand would be expected to sag more or less between the poles. This would depend on how firm the poles were held after being set.

—*a*— are poles or rods of any convenient size or length, and the fabric constituting the guide is comprised of horizontal articulate members or strands —*b*—, the number being in proportion to the depth of the water, and —*c*— are end strands to which the longitudinal strands are secured, the longitudinal and end strands being secured at each corner to a ring —*d*—, through which or by which the fabric is secured to the poles —*a*— the poles at the upper portion being provided with some means, as a lug or hook —*e*— so as to hold the fabric at its upper end in position with respect to the poles, the lower end being held in place by its own weight, —*f*— are vertical strands preferably of twine, rope or cordage to hold the longitudinal strands an equal distance apart. These vertical strands —*f*— may be made of wire or chain, but I have found it more convenient to make them of some material which may be conveniently cut away or removed as at times it is desired to reduce the size of the mesh or increase it, and by employing a vertical strand of some non-metallic material it may be readily removed or cut off and new ones substituted at the points desired. It will be observed that these pieces of fabric may be made up into any lengths or widths desired according to the work in hand.

Having described my invention what I claim is:—

1. The fish guide comprising horizontal members formed of large link chain and being substantially uniformly spaced apart, and vertical non-metallic stringer members connecting said horizontal members together to form a structure having guiding action on fish many times smaller than the actual size of the meshes.

2. The fish guide comprising widely spaced longitudinal members formed of large link chain and transverse cord stringer members connecting said longitudinal members together to form an open mesh structure having guiding action on fish many times smaller than the actual size of the meshes.

3. The stationary fish guide comprising widely spaced longitudinal chain members, substantially transverse non-metallic stringer members connecting said longitudinal members together and coöperating supports for said members to form a structure having such open mesh as to minimize debris collection and capable of guiding fish many times smaller than the actual size of the meshes.

In witness whereof I have hereunto set my hand this twelfth day of December 1910.

WILLIAM KING BLODGETT.

Witnesses:
   Russell Ross,
   James M. Vannote.